Aug. 12, 1958    M. SPIEGEL ET AL    2,847,379
METHOD AND APPARATUS FOR TREATING SEWAGE SLUDGE
Filed May 31, 1952

Inventors,
Milton Spiegel
and Miles A. Lamb
By: Schneider & Dressler, Attys.

United States Patent Office 2,847,379
Patented Aug. 12, 1958

2,847,379

METHOD AND APPARATUS FOR TREATING SEWAGE SLUDGE

Milton Spiegel, Glencoe, and Miles A. Lamb, Chicago, Ill., assignors to Chicago Pump Company, a corporation of Delaware Application May 31, 1952, Serial No. 290,848

2 Claims. (Cl. 210—6)

The present invention relates to method and apparatus for treating sewage sludge, and particularly to a method and means for heating the sludge to facilitate the decomposition of the organic materials present therein.

The advantages of heating sludge to facilitate its decomposition are well known, but heretofore the heating has been done by means of heating coils positioned in the digester tank. The use of heating coils in the digester tank has several disadvantages. In the first place a considerable amount of heat is lost in the pipes leading from the heat source to the digester tank. If the sludge falls below the level of some of the coils, the exposed coils are not functioning and additional heat is lost. If all the coils are positioned below the low water level the upper portions of the sludge are not heated properly when the sludge is above the low water level. The sludge frequently cakes on the heating coils and interferes with the transmission of heat. Additionally, the pipes and brackets in the digester tank often become corroded, and the digester tank must be emptied and cleaned in order to repair or replace the corroded parts.

In the apparatus constructed in accordance with the present invention the sludge is heated outside the digester tank, thereby eliminating the necessity of draining the digester tank to service the heating element. A number of heaters can be used with a single digester tank so that any heater may be serviced without interfering with the continuity of the sludge treating process. External heaters make it possible to control the sludge temperature with a minimum of variation from top to bottom of the digester tank, and eliminate cold zones in the digester tank which retard digestion. Heat is distributed in the digester tank by circulation of the heated sludge. Heat loss through the pipe walls is less for the sludge than for the same length of hot water piping because of the lower temperature differential and the lower cooling constant of sludge.

Figure 1:
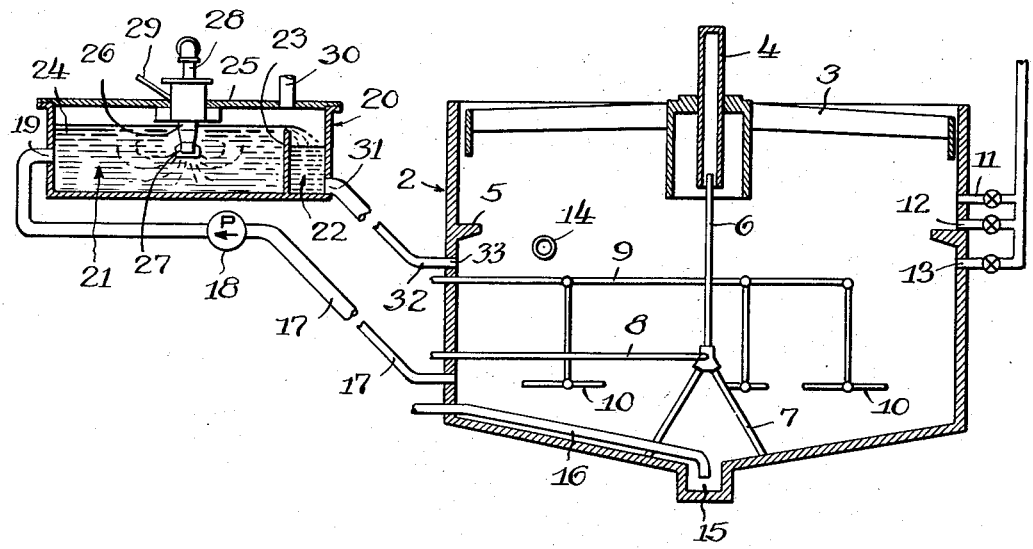
Figure 2:
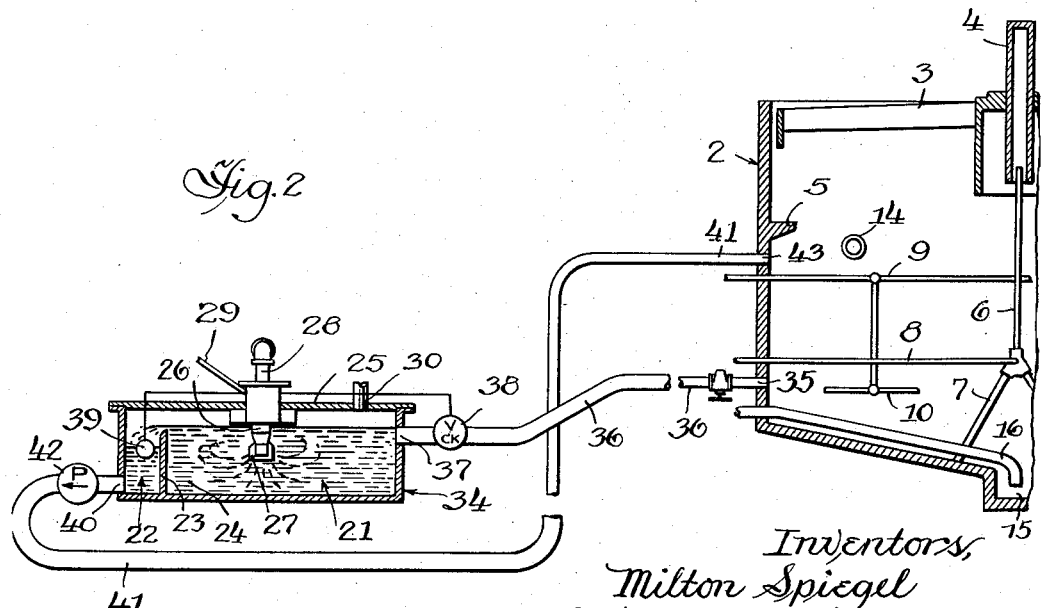

The invention will be fully understood from the following description, illustrated by the accompanying drawing in which:

Figure 1 is a cross sectional view through the digester tank and the external heating element associated therewith, the heater tank and associated apparatus being shown on an enlarged scale; and Figure 2 is a view similar to Figure 1 showing another embodiment of the invention in which the heater tank is positioned below the level of the draw-off line through which sewage sludge flows from the digester tank.

Referring to the drawing, the numeral 2 indicates a digester tank provided with a conventionally illustrated floating roof 3 and a gas collecting dome 4. Digester tank 2 is provided internally with brackets 5 extending inwardly from its wall to provide supports for the floating roof at the lowermost point of its normal travel. A gas draw-off pipe 6 is provided within the tank, being supported vertically by braces 7 and with its open top entering the gas dome 4. At its lower end the gas draw-off pipe communicates with a line 8. A portion of the gas produced in the digestion process is taken from line 8 and recirculated through another line 9 and through diffusers 10 into the sludge in digester tank 2. The diffusers, which are diagrammatically illustrated, may be of any suitable type, for example, tubular. These tubular diffusers extend from opposite sides of a header, as shown in United States patent to Lannert, No. 2,328,655, granted September 7, 1943.

In ordinary operation, the digester tank will be filled to its normal operating level, and when additional sewage sludge is to be added, an amount of supernatant digested sludge liquor, corresponding to the amount of sludge to be added, will be drawn off from an upper level in the digester tank 2 through one or more of the withdrawal pipes 11, 12 or 13. The sludge added to the sludge in the digester tank is introduced through the inlet 14. Digested sludge, settling to the sump 15 in the digester tank 2, is drawn off through the line 16 to sludge beds or for disposition in some other usual manner. Some portion of this digested sludge may be returned to the digester tank or added to the primary sludge before it enters the digester tank, as a source of the organisms effective in the digestion process. Preferably the ratio of raw sludge to digested sludge, when the latter is so added, is in the order of 7 to 1.

In the embodiment of the invention illustrated in Figure 1, the sewage sludge being treated in the digester tank 2 is continuously drawn off through line 17 by means of any suitable pump 18 and introduced through inlet 19 into a heater tank 20. The heater tank 20 is divided into two compartments 21 and 22 by a weir 23 which controls the sludge liquid level in the compartment. Weir 23 is high enough to prevent any of the sewage sludge 24 from passing through the heater tank without being heated.

Tank 20 includes a cover 25 which supports a burner unit 26 projecting downwardly into the sludge. The burner ports 27 are completely submerged in the sludge normally retained in compartment 21. A compressed mixture of air and gas from a mixing chamber (not shown) is fed to burner 26 through a pipe 28. The burner is also provided with a lighting tube 29 through which a torch may be inserted to ignite the air-gas mixture. The specific burner structure is not essential to the invention, and any burner capable of operating in the manner described may be used. One such burner, manufactured by Selas Corporation of America, is available commercially under the name "Selas."

When compartment 21 of the heater tank is filled with sewage sludge and burner 26 is operating, the hot products of combustion emerge from the burner ports directly into the sludge at a temperature of about 2400° F. and a a speed of about 30 feet per second. This high velocity causes the heated sludge in compartment 21 to be strongly agitated and distributes the heat throughout the sludge. The strong agitation also prevents the sludge from settling in the heater tank or from becoming encrusted on the burner parts. The exhaust gases from the burner escape from the heater tank through an outlet 30 provided therefor in the cover 25.

The inlet 19 is positioned below the top level of weir 23, and on the opposite side of the tank 20, so that the sludge entering through inlet 19 must move into intimate contact with the sludge being heated and circulated throughout compartment 21 before it can spill over the top of weir 23. The sludge which spills over the top of weir 23 into the compartment 22 discharges through outlet 31 and then flows through the line 32 and into the digester tank 2 through inlet 33. As shown, discharge outlet 31 from tank 20 is preferably at a higher level than inlet 33 to digester tank 2, so that the heated sludge may flow through line 32 and into the digester tank by gravity.

In the embodiment of the invention illustrated in Figure 2 the structure of the digester tank 2 and the heater tank is substantially the same as in the embodiment of Figure 1. The essential difference between the two embodiments is the level at which the heater tank is positioned relative to the digester tank. Accordingly, the detailed description of the identical parts of the structure will not be repeated.

The heater tank 34 is positioned below the level of a sludge outlet 35 in digester tank 2. Sludge flows from the digester tank through outlet 35 and through a line 36 by gravity through an inlet 37 into the heater tank. The line 36 is provided with a valve 38 operated by a float 39 positioned in compartment 22 and controlled by the level of the sludge 24. Valve 38 remains open as long as the level of the sludge in compartment 22 is substantially lower than the level in compartment 21. Under these conditions the sludge in compartment 21 becomes thoroughly mixed with the heated sludge before it spills over weir 23. When the inflow of sludge to the heater tank becomes so great that the sludge flows directly from inlet 37 through the heater tank and over weir 23 the level in compartment 22 raises rapidly and lifts the float 39. This causes valve 38 to close and thereby shuts off the flow of sludge into the heater tank until the level of sludge in compartment 22 moves downwardly a sufficient distance to insure the retention of sewage sludge flowing into the heater tank in compartment 21 until it is thoroughly mixed with the heated sludge in said compartment.

Compartment 22 is provided with an outlet 40, and the line 41 leading therefrom is provided with a pump 42 capable of pumping sludge therethrough and into an inlet 43 leading into digester tank 2. Pump 42 is preferably regulated so the flow of sludge out of the heater tank back to the digester tank is substantially the same as the flow of sludge through line 36 into the heater tank. With the pump so regulated the level of sewage sludge in compartment 22 will remain substantially in the same desired relationship to the level of the sludge in compartment 21, and the flow of sewage from digester tank to heater tank and back to digester tank will be continuous.

Although we have described two preferred embodiments of our invention in considerable detail, the description thereof is intended to be illustrative, rather than restrictive, as many details may be modified or changed, without departing from the spirit or scope of the invention. Accordingly, we do not desire to be restricted to the exact structure disclosed.

We claim:

1. In a sewage sludge digestion apparatus, a heater tank comprising two compartments with an inlet leading to one of said compartments and an outlet leading from the other, a weir separating said compartments, the top edge of said weir extending high enough to prevent sludge entering said inlet from passing directly through said outlet, and a burner in said one compartment, said burner having ports positioned below the level of the top edge of said weir whereby sludge in said one compartment is heated by said burner before it passes over said weir into said other compartment.

2. In a sewage sludge digestion apparatus, a heater tank comprising two compartments with an inlet leading to one of said compartments and an outlet leading from the other, a weir separating said compartments, the top edge of said weir extending high enough to prevent sludge entering said inlet from passing directly through said outlet, a burner in said one compartment, said burner having ports positioned below the level of the top edge of said weir, said burner being capable of forcing burning gases into direct contact with sludge in said one compartment at a substantial velocity, whereby the sludge in said one compartment is simultaneously heated and agitated before it passes over said weir into said other compartment.

References Cited in the file of this patent

UNITED STATES PATENTS

| | | |
|---|---|---|
| 625,605 | Ridgway | May 23, 1899 |
| 1,820,976 | Imhoff | Sept. 1, 1931 |
| 2,516,076 | Schlenz | July 18, 1950 |
| 2,538,412 | Cecil et al. | Jan. 16, 1951 |
| 2,542,602 | Walker | Feb. 20, 1951 |
| 2,572,767 | Schlenz | Oct. 23, 1951 |
| 2,594,433 | Hess et al. | Apr. 29, 1952 |

OTHER REFERENCES

Keefer: "Water and Sewage Works," June 1946, pp. 236–238.